United States Patent [19]

Pennison et al.

[11] Patent Number: 4,681,490
[45] Date of Patent: Jul. 21, 1987

[54] RETRACTION APPARATUS FOR AUTOMATIC FEED DRILLS OR THE LIKE

[75] Inventors: Robert A. Pennison, Bellville; Richard E. Eckman, Houston, both of Tex.

[73] Assignee: Dresser Industries, Inc., Dallas, Tex.

[21] Appl. No.: 848,180

[22] Filed: Mar. 27, 1986

Related U.S. Application Data

[63] Continuation of Ser. No. 547,702, Oct. 31, 1983, Pat. No. 4,592,681.

[51] Int. Cl.$^4$ .............................................. B23B 45/04
[52] U.S. Cl. ....................................... 408/10; 173/19; 173/154; 408/14; 408/102; 408/137
[58] Field of Search ...................... 408/10, 13, 14, 11, 408/102, 130, 137, 141, 1 R; 10/136 R; 173/19, 32, 154

[56] References Cited

U.S. PATENT DOCUMENTS 4,592,681 6/1986 Pennison et al. ..................... 408/10

OTHER PUBLICATIONS

A. B. Quackenbush Co. Manual for Drill Series 15QDA-RA-SU.

Primary Examiner—Z. R. Bilinsky

[57] ABSTRACT

The automatic feed drill includes a spindle mounted therein for rotating in reciprocating movement. The spindle is rotated by spindle rotation gear that is engaged with the main drive gear which is ultimately driven by an air motor or the like. The feed and retraction movement (reciprocation) is caused by a spindle feed gear that is threaded onto the spindle. The spindle feed gear is engaged with a feed gear which, during feed movement, is driven by the main drive gear, and during retraction movement, is shifted into a position wherein the feed gear is prevented from rotating. The spindle also carries a collar or other abutment that engages a shift lever at the end of the feed movement. The shift lever is moved by the collar, and, due to its interconnection with the feed gear, moves the feed gear out of engagement with the main drive gear and into the position wherein it is prevented from rotating. The apparatus also includes a yieldable stop device that holds the feed gear stopped during retraction movement. In the event that excessive torque is encountered, such as by a lower collar on the spindle engaging the housing, the yieldable stop member rotates at the same speed as the spindle feed gear and thus, prevents further retraction of the spindle and avoids damage to the drill.

10 Claims, 5 Drawing Figures

RETRACTION APPARATUS FOR AUTOMATIC FEED DRILLS OR THE LIKE

This application is a continuation of U.S. patent application Ser. No. 547,702, filed Oct. 31, 1983, now Pat. No. 4,592,681.

BACKGROUND OF THE INVENTION

This invention relates generally to improved retraction apparatus for automatic feed drills or the like. Particularly, but not by way of limitation, this invention relates to an improved retraction apparatus having means for shifting the feed gear out of engagement with the main drive gear during retraction and to yieldable stop apparatus located in the housing for stopping the retracting movement of the spindle.

In the past, automatic feed drills have been provided with a spring that engages the main drive gear and the feed gear. When the feed gear is released by the feed lever, the feed gear shifts out of engagement with the drive gear and into a position wherein the feed gear is locked. Such an arrangement has been reasonably successful, but in some instances, and particularly when the drill is heavily loaded, there is too much force exerted on the gears to permit the spring to consistently drive the feed gear into its retraction position, that is, into the position wherein it will be stopped. Failure to shift the feed gear can cause the drill to continue to feed, or in some instances, may damage the drill due a stop collar or other device used on the spindle which may engage the drill housing.

Also, various ways have been tried in the past to prevent over retraction of the spindle after the hole has been drilled to the desired depth. In one apparatus, a contact actuated valve is provided that engages a collar or other abutment on the spindle during the retraction movement, shifting the drill into automatic feed movement so that the drill continues to alternate between feed and retraction movement until the operator stops the drill. Also, it has been proposed to provide a stop on the spindle that engages the drill housing causing the drill motor to stall. Manifestly, this has not been very successful in that damage can occur to the various portions of the gear drive mechanism in the drill.

Accordingly, one object of this invention is to provide an improved retraction apparatus for automatic feed drills wherein the drill is positively shifted between the feed and retraction movements, and wherein the retraction movement is stopped in the event that the retraction movement has been completed or in the event that high torque loads are encountered during retraction to prevent damage to the drill.

SUMMARY OF THE INVENTION

This invention provides an improved retraction apparatus for automatic feed drills that includes a housing, a rotatable tool spindle located for reciprocating movement in the housing, and driving means located in the housing operably connected with the spindle for rotating and reciprocating the spindle in feeding and retraction movements. The driving means includes a spindle rotation gear engaged with the spindle to rotate the spindle and that is slidable thereon. The spindle feed gear is engaged with the spindle to cause reciprocating movement of the spindle. A main drive gear that is driven by the air motor or the like is engaged with the spindle rotation gear to cause rotation thereof. A feed gear engages the spindle feed gear and is moved in and out of engagement with the main drive gear. The feed gear, when driven by the main drive gear, causes rotation of the spindle feed gear to move the spindle in feeding movement. When not driven by the main drive gear, the feed gear moves the spindle in retraction movement. Shift apparatus is connected to the feed gear and is engageable with the spindle for moving the feed gear out of driving engagement with the main drive gear.

BRIEF DESCRIPTION OF THE DRAWING

The foregoing and additional objects and advantages of the invention will be more apparent when the following detailed description is read in conjunction with the accompanying drawing, wherein like reference characters denote like parts in all views and wherein.

DETAILED DESCRIPTION OF THE PREFERRED EMBODIMENT

Figure 1:
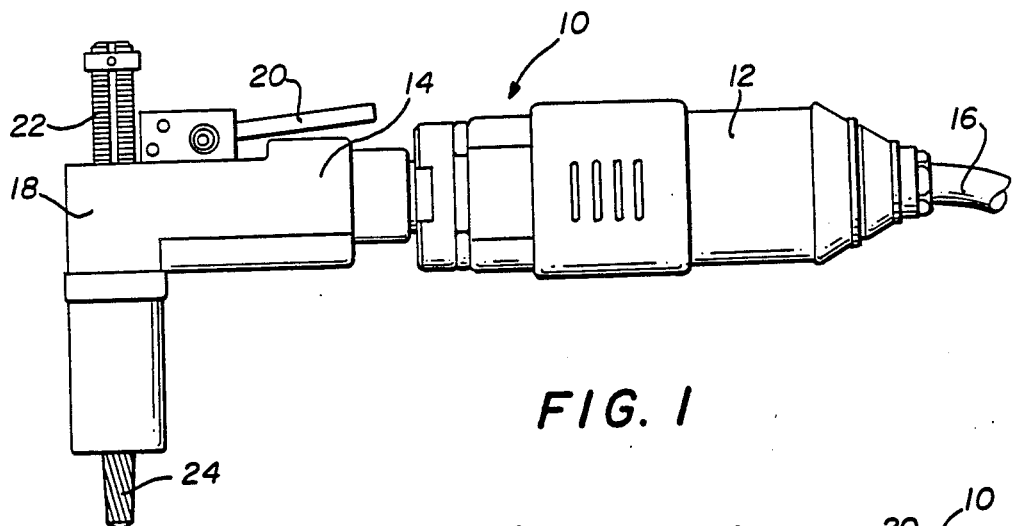
FIG. 1 is an elevation view of an automatic feed drill that is constructed in accordance with the invention.

Referring to the drawing, and to FIG. 1 in particular, shown therein and generally designated by the reference character 10, is an automatic feed drill that is constructed in accordance with the invention. The drill 10 includes a motor portion 12, which in this instance, is illustrated as being a pneumatic motor, although other types may be utilized if desired. The drill 10 also includes a feed head 14, which is illustrated as being a right angle feed head. Connected to the motor 12 is a pneumatic conduit 16 for providing the appropriate air supply to the motor 12.

The feed head 14 includes a housing 18 on which is pivotally mounted a shift lever 20. The shift lever 20, when placed in the appropriate position, will cause a spindle 22 and a drill 24 attached to the lower end of the spindle to either be fed toward a work piece 26 (see FIG. 2), or retracted therefrom as is appropriate.

Figure 2:
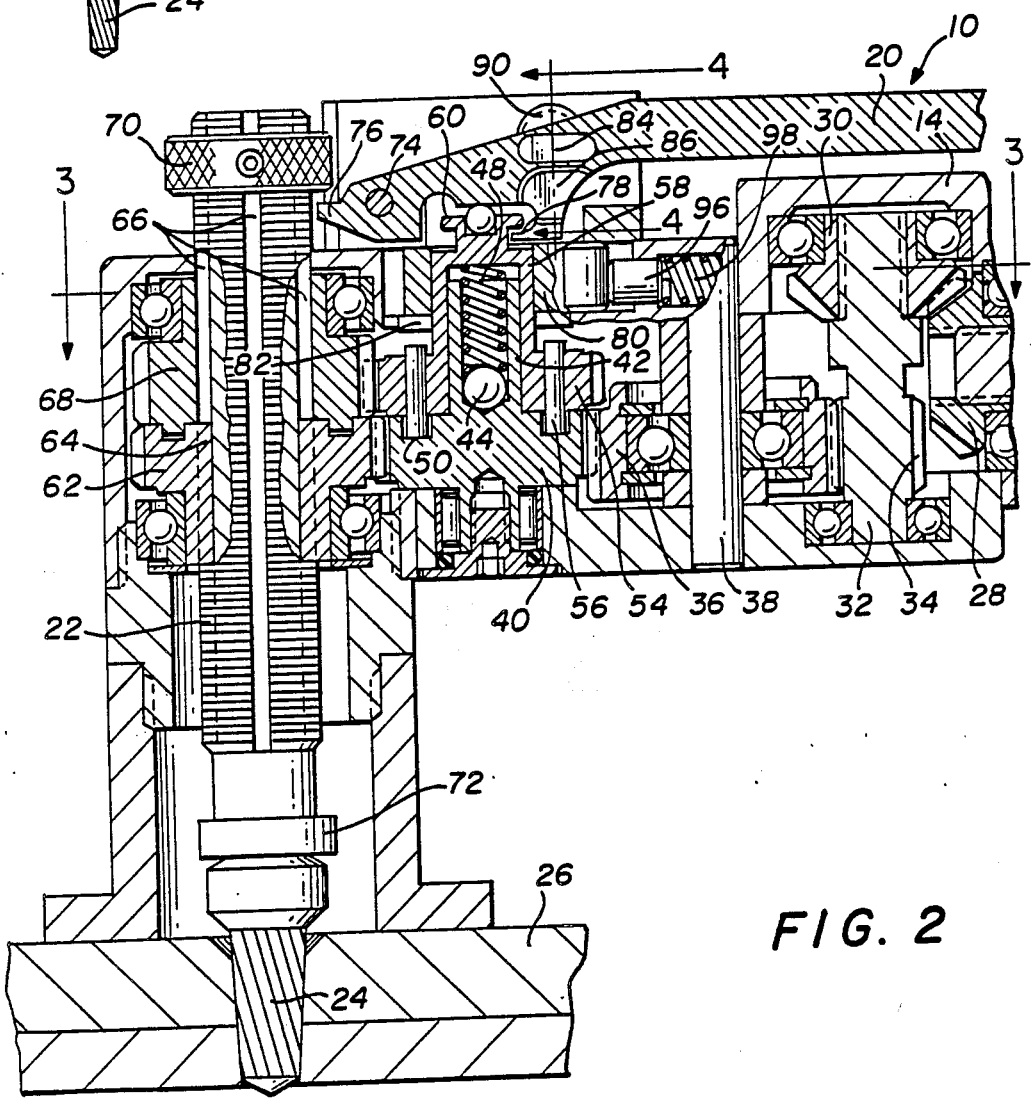
FIG. 2 is an enlarged view, partially in cross-section, of a portion of the drill illustrated in FIG. 1 and illustrates components thereof that are constructed in accordance with the invention.

Referring to FIG. 2, it can be seen therein that the drill 10 is located adjacent to the work piece 26 as required for drilling a hole therein with the drill 24. At the right hand side of FIG. 22, there can be seen a bevel gear 28 that is in mesh with a bevel gear 30 that is mounted on a shaft 32. The shaft 32 includes a spur gear portion 34.

The spur gear portion 34 drives an idler gear 36, that is mounted for rotation on a shaft 38 located in the housing 14. The idler gear 36 drives a main drive gear 40.

The main drive gear 40 is mounted for rotation in the housing and includes an upwardly extending hollow portion 42 that has in its interior a ball 44 and spring 48. In the upper surface of the main drive gear 40, there is provided an annular recess 50 having at least one lug 52 (see FIG. 5) located therein.

The main drive gear 40 is shown in FIG. 2 in driving relationship with a feed gear 54. The feed gear 54 includes pins 56 that extend from the upper and lower surfaces thereof. The lower end of the pins 56 extend into the annular recess 50 in driving engagement with the lugs 52 when the feed gear 54 is in position illustrated in FIG. 2.

The feed gear 54 has an upwardly extending portion 58 of reduced diameter that fits in telescoping relationship with the upper portion 42 of the main drive gear 40. The spring 48, which is disposed in the interior of the gear 40, has one end in engagement with the upper end of the feed gear 54, and the other end in engagement with the ball 44 that is resting in the gear 40 for purposes that will be explained hereinafter. The uppermost end of the gear 54 is provided with an annular shoulder 60.

In addition to the feed gear 54, the main drive gear 40 also drives a spindle rotation gear 62. The spindle rotation gear 62 has an interior that is sized to slip over the spindle 22 and includes lugs or keys 64 that are disposed in the four slots 66 formed longitudinally in the exterior of the spindle 22. Due to the engagement between the lugs 64 and the spindle 22 in the slots 66, it is possible to transmit rotational motion to the spindle 22 while permitting the spindle 22 to move longitudinally through the spindle rotation gear 62.

Also mounted on the spindle 22 is a spindle feed gear 68 that has its interior threaded to mate with the threads on the exterior of the spindle 22. It will be noted that the spindle feed gear 68 is in mesh with the feed gear 54 in the feed position of the drill 10 illustrated in FIG. 2.

Mounted on the spindle 22 is an upper collar 70 which serves to limit the amount that the spindle 22 is fed downwardly, and thus control the depth of the hole drilled by the bit 24. At the lower end of spindle 22 there is provided a second collar or abutment 72 that engages the lower end of the housing 14 during retraction movement of the spindle 22 to limit the amount of retraction movement of the spindle 22.

The shift lever 20 is pivotally mounted on the housing 14 by a pivot pin 74. Adjacent to the pivot pin 74 is a protuberance 76 which, as can be seen in FIG. 2, is positioned so as to be engaged by the abutment or collar 70 that is secured to the upper end of the spindle 22.

Figure 5:
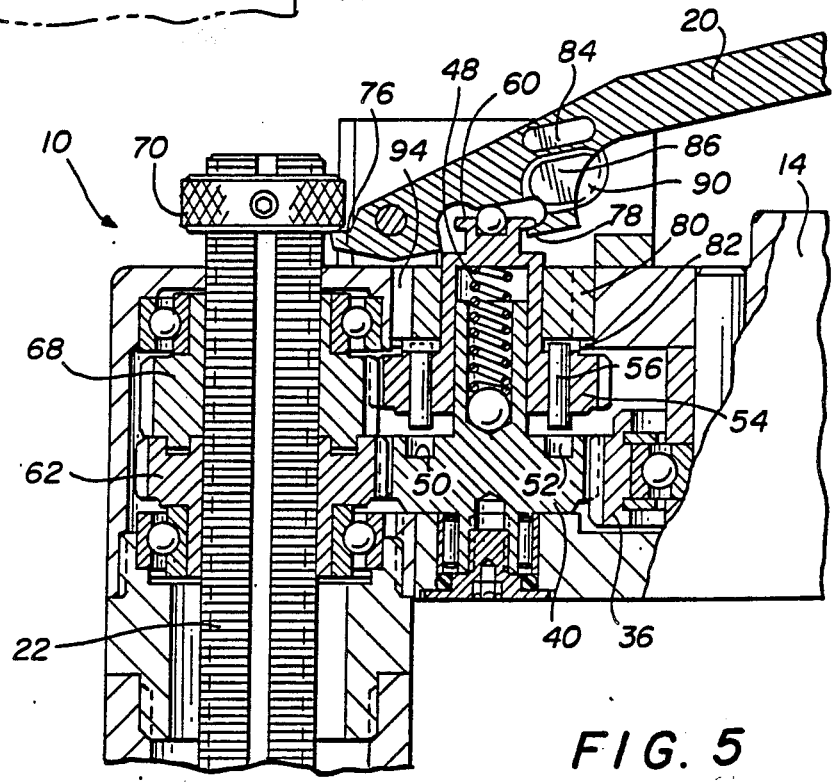
FIG. 5 is a cross-sectional view similar to FIG. 2, but illustrating the various components of the drill in other operating positions.

The shift lever 20 also includes a tang 78 that projects underneath the annular shoulder 60 on the feed gear 54. The tang 78 as shown in FIG. 5, engages the shoulder 60 upon upward movement of the lever 20 to lift the feed gear 54 out of driving engagement with the main drive gear 40.

In order to stop the rotation of the feed gear 50, there is provided an annular stop member 80 that encircles the upper end of the feed gear 50. The stop member 80 has in its lower surface a recess with lugs 82 arranged to engage the upper ends of the pins 56 that are carried by the feed gear 54. Accordingly, when the feed gear 54 is moved into the position illustrated in FIG. 5, that is, the retract position, it can be seen that the upper end of the pins 56 engage the lugs 82 on the bottom of the stop member 80.

Figure 4:
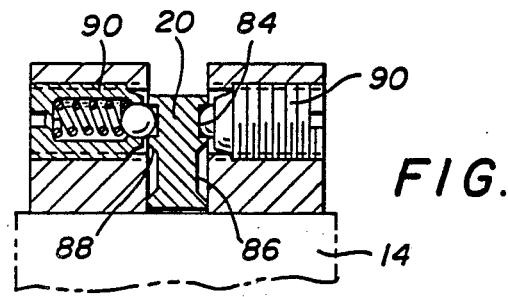
FIG. 4 is an enlarged partial cross-sectional view taken generally along the line 4—4 of FIG. 2.

The lever 20 is provided on each side with a pair of recesses 84 and 86. The recesses may be more clearly seen in FIGS. 4 and 5. As shown in FIG. 4, the upper recess 84 is generally provided with a right angled wall while the lower recess 86 is provided with an angularly disposed wall 88. A pair of spring-loaded detents 90 are positioned in the housing 14 so that they will be disposed in the upper recesses 84 when the feed gear 54 is in driving relationship with the main drive gear 40, and will be disposed in the lower recesses 86 when the drive gear 54 is in engagement with the stop member 80 and out of driving engagement with the main drive gear 40.

The surface 80 is tapered or at an angle because the feed velocity of the spindle 22 may be relatively low so that the collar 70 engages the protuberance 76 at a very low speed, causing the lever 20 to be moved very slowly. With the angular disposition of the surface 88, the detents 90 force the lever to snap upwardly into the positon illustrated in FIG. 5 from the FIG. 2 position, and thus make certain that the feed gear 54 moves quickly and completely out of engagement with the main drive gear 40 and into engagement with the stop member 80.

Figure 3:
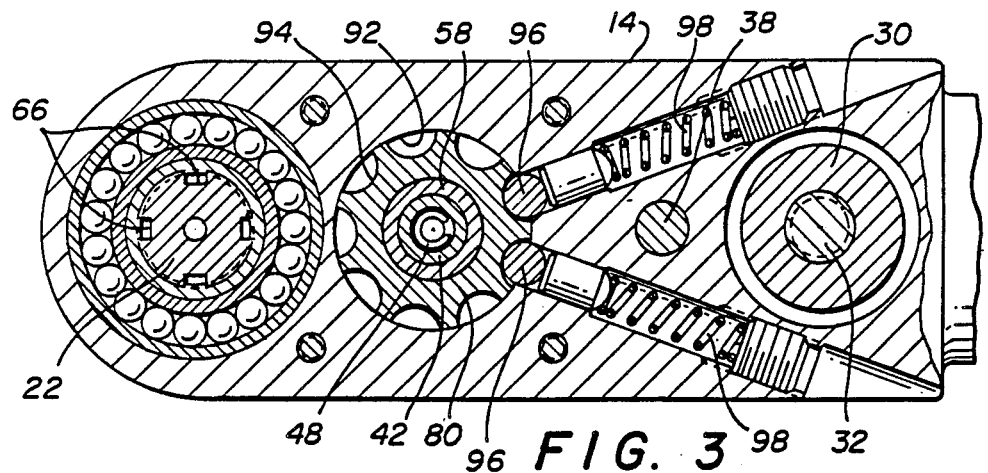
FIG. 3 is a cross-sectional view taken generally on the line 3—3 of FIG. 2.

The stop member 80 is rotatably located in an opening 92 formed in the housing 14 as shown most clearly in FIG. 3. It will be noted that the exterior of the stop member 80 is provided with a plurality of circumferentially spaced recesses 94 that are sized to receive a pair of detents 96. As clearly shown in FIG. 3, the detents are urged into resilient engagement with the stop member 80 by springs 98. Thus, it can be seen that if the feed gear 54 is caused to rotate when the pins 56 are in engagement with the lugs 82 of the stop member 80, the stop member 80 will also rotate displacing the detents 96 against the force of the springs 98 somewhat similar to a ratcheting action.

OPERATION OF THE PREFERRED EMBODIMENT

With the spindle 22 retracted upwardly to the position wherein the drill 24 does not contact the work piece 26, the air motor is started and the shift lever 20 placed in the position illustrated in FIG. 2. When in this position, the shift lever 20 forces the feed gear 54 down into driving engagement with the main drive gear 40 which is being rotated through the gear train previously described. Accordingly, the spindle 22 and drill bit 24 are being rotated through the spindle rotation gear 62. Also, the feed gear 54 causes the spindle feed gear 68 to rotate at a speed greater than the rotational speed of the spindle 22, and since the spindle feed gear 68 is threaded to the spindle 22, the spindle is fed downwardly in feed movement.

The feed movement continues until the collar 70, which has been previously set at the desired depth for the hole, engages the protuberance 76 on the shift lever 20. When this engagement occurs, the shift lever 20 pivots about the pin 74, moves relatively away from the main drive gear 40 and, through the engagement between the tang 78 and the shoulder 60, pulls the feed gear 54 upwardly and out of driving engagement with the main drive gear and into engagement with the stop member 80.

When the feed gear 54 ceases to rotate, the spindle feed gear 68, which is in mesh with the feed gear 54, also stops rotating. When this occurs, the differential in speed between the spindle feed gear 68 and the spindle 22 upon which the spindle feed gear 68 is threaded, causes the spindle to start retracting, that is, moving upwardly in retracting movement.

When the retraction movement reaches the point where the abutment or collar 72 on the spindle 22 engages the lower end of the housing 14, a load is placed on the spindle feed gear 68 causing it to rotate and in turn, rotate the feed gear 54. Rotation of the feed gear 54 causes rotation of the stop member 80 at the same speed. When the speeds are the same, the spindle 22 no longer moves upwardly or downwardly and the stop member 80 simply ratchets past the detents 96. Thus, no damage will be done to the drill 10 in the event that the retraction movement occurs when the operator is not present or if he does not notice that the retraction has been completed.

It should also be pointed out that the feed gear 54 cannot become locked in a neutral position, that is, in the position wherein it is neither in engagement with the main drive gear 40 or with the stop member 80 due to the presence of the detents 90 and the recesses 84 and 86 formed in the shift lever 20.

After the retraction stroke, if it is desired to redrill the hole, or when the drill 10 is moved to another hole, feed movement is again enacted in the drill 10 by depressing the shift lever 20, placing the parts of the drill 10 in the condition as generally shown in FIG. 2.

From the foregoing detailed description, it should be apparent that the invention described herein presents an improved retraction apparatus for automatic feed drills that prevents damage to the drill during the retraction movement and further, provides an automatic feed drill wherein the change from feed movement to retraction movement occurs quickly and completely in a positive manner, so that the drill will consistently shift from feed to retraction without difficulty.

Having described but a single embodiment of the invention, it will be apparent to those skilled in the art that there may be many changes and modifications to this invention without departing from the spirit and scope of the invention.

The embodiments of the invention in which an exclusive property or privilege is claimed are defined as follows:

1. Improved retraction apparatus for automatic feed drills including a housing, a rotatable tool spindle located for reciprocating movement in the housing, and driving means located in said housing operably connected with said spindle for rotating and reciprocating said spindle in feeding and retraction movements, said driving means including a spindle rotation gear engaged with said spindle to rotate said spindle and slidable thereon, a spindle feed gear engaged with said spindle to cause the reciprocating movement of said spindle, a main drive gear driven by said drive means and engaged with said spindle rotation gear to cause rotation thereof, and a feed gear engaging said spindle feed gear movable into and out of engagement with said main drive gear, said feed gear, when driven by said main drive gear, causing rotation of said spindle feed gear to move said spindle in feeding movement, and, when not driven by said main drive gear, moving said spindle in retraction movement, the improvement comprising shift means connected to said feed gear and engageable with said spindle for moving said feed gear out of driving engagement with said main drive gear.

2. The improved retraction apparatus of claim 1 wherein:
   said spindle has an abutment located thereon that is movable therewith during said feeding and retraction movements; and
   said shfit means includes a shift lever member pivotally mounted on said housing and having a portion thereon engageable with said abutment, said lever member being pivoted from a first position holding said feed gear in driving engagement with said main drive gear to a second position holding said feed gear out of driving engagement with said main drive gear, upon engagement between said abutment and said portion on said lever.

3. The improved retraction apparatus of claim 2 wherein:
   said feed gear includes an annular shoulder adjacent one end thereof; and,
   said lever member includes a shoulder engaging portion, which, when said lever member is pivoted to said second position, engages said annular shoulder to move said feed gear out of driving engagement with said main drive gear.

4. The improved retraction apparatus of claim 3 wherein said housing is provided with at least one detent located in engagement with said shift lever member and wherein said shift lever includes a pair of recesses located to receive said detent in each of said positions of said feed gear.

5. The improved retraction apparatus of claim 4 wherein:
   one of said recesses is located to securely retain said lever in the position corresponding to the first position of said feed gear; and
   the other of said recesses is provided with an annular wall surface for causing, in conjunction with said detent, said lever to be quickly moved in a position corresponding to the second position of said shift gear, whereby said feed gear is quickly and completely moved to said second position from said first position.

6. Improved retraction apparatus for automatic feed drills including a housing, a rotatable tool spindle located for reciprocating movement in the housing, and driving means located in said housing operably connected with said spindle for rotating and reciprocating said spindle in feeding and retraction movements, said driving means including a spindle rotation gear engaged with said spindle to rotate said spindle and slidable thereon, a spindle feed gear engaged with said spindle to cause the reciprocating movement of said spindle, a main drive gear driven by said drive means and engaged with said spindle rotation gear to cause rotation thereof, and a feed gear engaging said spindle feed gear movable into and out of engagement with said main drive gear, said feed gear, when driven by said main drive gear, causing rotation of said spindle feed gear to move said spindle in feeding movement, and, when not driven by said main drive gear, moving said spindle in retraction movement, the improvement comprising shift means including a shift lever member pivotally mounted on said housing, said lever member in a first position, engaging said feed gear to hold said feed gear in driving engagement with said main drive gear and, in a second position, holding said feed gear out of driving engagement with said main drive gear.

7. The improved retraction apparatus of claim 6 wherein:
   said spindle has an abutment located thereon that is movable therewith during said feeding and retraction movements; and
   said shift lever member has a portion thereon engageable with said abutment, said lever member being pivoted from a first position holding said feed gear in engagement with said main drive gear to a second position holding said feed gear out of driving engagement with said main drive gear, upon engagement between said abutment and said portion on said lever.

8. The improved retraction apparatus of claim 7 wherein:
said feed gear includes an annular shoulder adjacent one end thereof; and,
said lever member includes a shoulder engaging portion, which, when said lever member is pivoted to said second position, engages said annular shoulder to move said feed gear out of driving engagement with said main drive gear.

9. The improved retraction apparatus of claim 8 wherein said housing is provided with at least one detent located in engagement with said shift lever member and wherein said shift lever includes a pair of recesses located to receive said detent in each of said positions of said feed gear.

10. The improved retraction apparatus of claim 9 wherein:
one of said recesses is located to securely retain said lever in the position corresponding to the first position of said feed gear; and
the other of said recesses is provided with an angular wall surface for causing, in conjunction with said detent, said lever to be quickly moved in a position corresponding to the second position of said feed gear, whereby said feed gear is quickly and completely moved to said second position from said first position.

* * * * *

UNITED STATES PATENT AND TRADEMARK OFFICE
CERTIFICATE OF CORRECTION

PATENT NO. : 4,681,490

DATED : Jul. 21, 1987

INVENTOR(S) : Robert A. Pennison and Richard E. Eckman

It is certified that error appears in the above-identified patent and that said Letters Patent is hereby corrected as shown below:

The term of this patent subsequent to June 3, 2003, has been disclaimed.

Signed and Sealed this

Sixth Day of December, 1988

*Attest:*

DONALD J. QUIGG

*Attesting Officer*      *Commissioner of Patents and Trademarks*